US012603010B2

(12) United States Patent
Dillard

(10) Patent No.: US 12,603,010 B2
(45) Date of Patent: Apr. 14, 2026

(54) SYSTEMS AND METHODS FOR ON-DEMAND ENABLING OF DISPLAY FEATURES FOR AN AVIONIC DISPLAY

(71) Applicant: HONEYWELL INTERNATIONAL INC., Charlotte, NC (US)

(72) Inventor: Michael Dillard, Plymouth, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 1076 days.

(21) Appl. No.: 17/204,533

(22) Filed: Mar. 17, 2021

(65) Prior Publication Data

US 2022/0301442 A1      Sep. 22, 2022

(51) Int. Cl.
| | |
|---|---|
| *G08G 5/21* | (2025.01) |
| *B64D 43/00* | (2006.01) |
| *G01S 13/95* | (2006.01) |
| *G06F 3/147* | (2006.01) |
| *G06F 21/10* | (2013.01) |

(52) U.S. Cl.
CPC .............. *G08G 5/21* (2025.01); *B64D 43/00* (2013.01); *G01S 13/953* (2013.01); *G06F 3/147* (2013.01); *G06F 21/10* (2013.01)

(58) Field of Classification Search
None
See application file for complete search history.

(56) References Cited

U.S. PATENT DOCUMENTS

| | | | |
|---|---|---|---|
| 8,742,974 B1 | 6/2014 | Sishtla et al. | |
| 9,411,044 B1 | 8/2016 | Sperling et al. | |
| 9,535,158 B1 | 1/2017 | Breiholz et al. | |
| 9,810,770 B1 | 11/2017 | Weichbrod et al. | |
| 10,175,388 B2 * | 1/2019 | Stulken ................ | G08G 5/0021 |
| 2018/0149745 A1 * | 5/2018 | Christianson ........... | G01S 7/062 |

FOREIGN PATENT DOCUMENTS

KR          102003321 B1      7/2019

* cited by examiner

*Primary Examiner* — Christian Chace
*Assistant Examiner* — Katherine Marie Fitzharris
(74) *Attorney, Agent, or Firm* — Ingrassia Fisher & Lorenz LLP

(57)          ABSTRACT

Systems and methods for on-demand enabling of display features for an avionic display in an aircraft while the aircraft is in flight. The method includes rendering the avionic display in accordance with a configuration file that specifies for each display feature of a plurality of display features, whether the display feature is enabled or disabled. When a feature trigger is received, the method determines when a display feature associated with the feature trigger is disabled in the configuration file and generates a notification that the display feature is disabled but available. The display feature can be enabled based on a pilot override. A fault code indicating that the display feature was enabled and an aircraft location at which the display feature was enabled is generated in the configuration file. The fault code can be reported to a subscription service when the flight has ended.

16 Claims, 2 Drawing Sheets

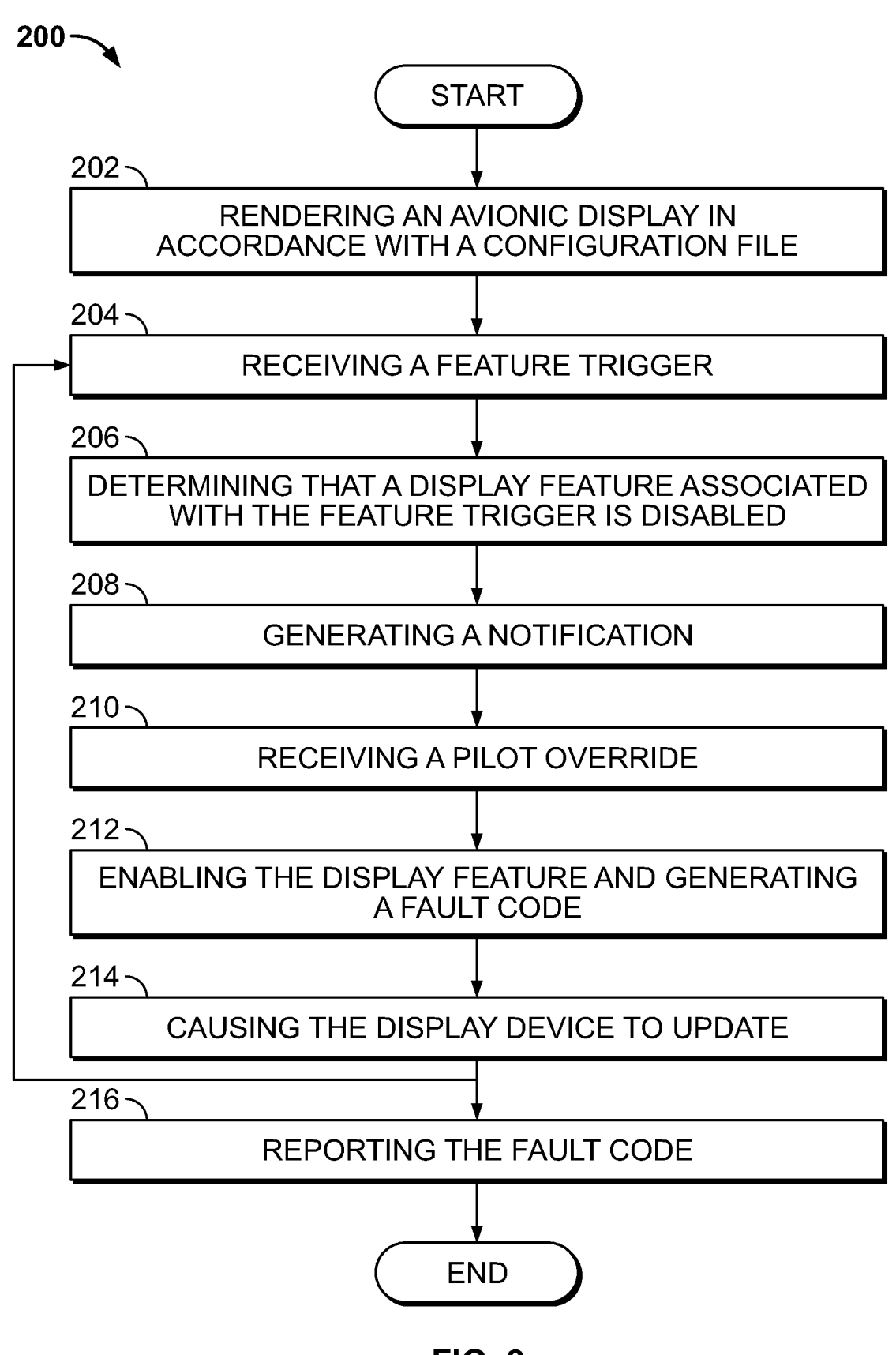

200

START

202 — RENDERING AN AVIONIC DISPLAY IN ACCORDANCE WITH A CONFIGURATION FILE

204 — RECEIVING A FEATURE TRIGGER

Figure 1:
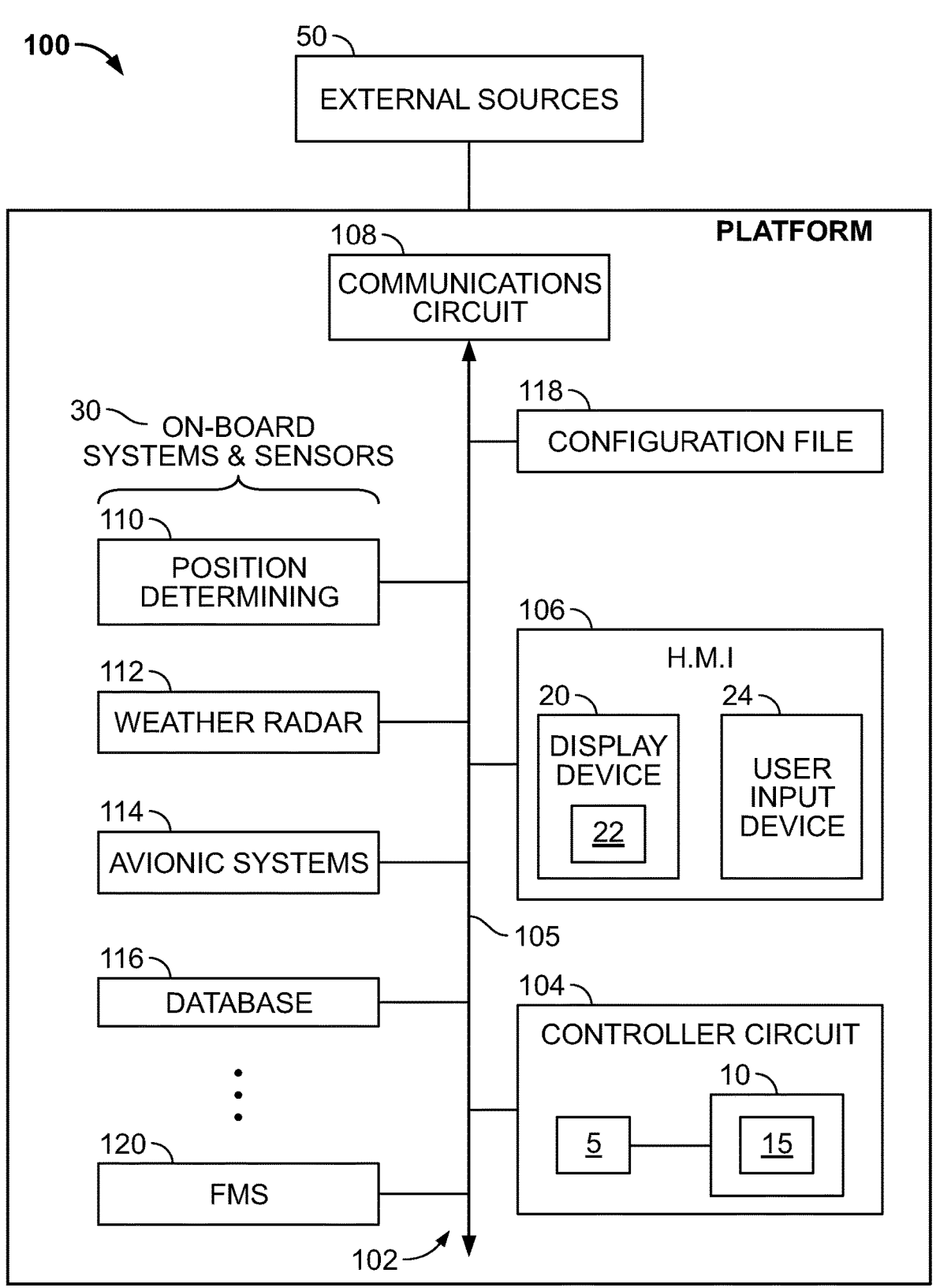

206 — DETERMINING THAT A DISPLAY FEATURE ASSOCIATED WITH THE FEATURE TRIGGER IS DISABLED

208 — GENERATING A NOTIFICATION

210 — RECEIVING A PILOT OVERRIDE

212 — ENABLING THE DISPLAY FEATURE AND GENERATING A FAULT CODE

214 — CAUSING THE DISPLAY DEVICE TO UPDATE

216 — REPORTING THE FAULT CODE

END

FIG. 2

SYSTEMS AND METHODS FOR ON-DEMAND ENABLING OF DISPLAY FEATURES FOR AN AVIONIC DISPLAY

TECHNICAL FIELD

The following disclosure generally relates to flight display systems. More particularly, the following disclosure relates to systems and methods for on-demand enabling of display features for an avionic display in an aircraft while the aircraft is in flight.

BACKGROUND

Scenarios are envisioned in which users subscribe to subscription services to provide display features and functionality for their avionic displays. One example is subscribing to a weather radar system subscription service that offers, at various cost points, various levels of weather indicators and details to be rendered on the avionic display. A configuration file represents the agreement with the subscription service and stores or encodes each of a plurality of display features as either being enabled or disabled.

A technical problem can occur when a user who has purchased a base-level subscription service may (knowingly or unknowingly), while in flight, face a safety need for a feature that has not been enabled. This in-flight need applies to weather subscription services as well as to a variety of other subscription services.

Accordingly, improved flight display systems and methods that provide on-demand enabling of display features for an avionic display in an aircraft while the aircraft is in flight are desirable. Furthermore, other desirable features and characteristics of the disclosure will become apparent from the subsequent detailed description and the appended claims, taken in conjunction with the accompanying drawings, brief summary, technical field, and this background of the disclosure.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a system for on-demand enabling of display features for an avionic display in an aircraft while the aircraft is in flight. The system includes: a source of aircraft status data for the aircraft; a display device operationally coupled to the source of aircraft status data and configured to render the avionic display showing a location and trajectory of the aircraft and to render information on the avionic display, in accordance with a configuration file; a trigger source configured to generate a feature trigger responsive to determining that trigger conditions are occurring; a controller circuit operationally coupled to the source of aircraft status data, the display device, and the trigger source, the controller circuit configured to: determine that a display feature associated with the feature trigger is disabled in the configuration file, responsive to the feature trigger; generate a notification that the display feature is disabled but available, responsive to determining that the display feature associated with the feature trigger is disabled in the configuration file; enable the display feature in the configuration file; and generate a fault code in the configuration file, the fault code indicating that the display feature was enabled and an aircraft location at which the display feature was enabled.

Also provided is a system for on-demand enabling of weather radar features for display in an aircraft. The system includes: a source of aircraft status data for the aircraft; a display device operationally coupled to the source of aircraft status data and configured to render an avionic display showing a location and trajectory of the aircraft and to render weather information on the avionic display, in accordance with a weather configuration file; a weather radar system configured to (i) determine convective cell growth from weather radar reflectivity data by calculating vertically-integrated reflectivity (VIR) values for a column of cells associated with a latitude/longitude position at a respective time, (ii) determine that trigger conditions are occurring when a difference between time-sequential VIR values exceed a weather hazard threshold, the feature trigger having a location at the latitude/longitude position, and (iii) generate a feature trigger responsive to determining that trigger conditions are occurring; and a controller circuit operationally coupled to the source of aircraft status data, the display device, and the weather radar system, the controller circuit configured to: determine that a display feature associated with the feature trigger is disabled in the weather configuration file, responsive to the feature trigger; generate a notification that the display feature is disabled but available, responsive to determining that the display feature associated with the feature trigger is disabled in the weather configuration file; enable the display feature in the weather configuration file; and generate a fault code in the weather configuration file, the fault code indicating that the display feature was enabled and an aircraft location at which the display feature was enabled.

A method for on-demand enabling of display features for an avionic display in an aircraft while the aircraft is in flight is also provided. The method includes: rendering, on a display device, the avionic display showing a location and trajectory of the aircraft, the rendering being in accordance with a configuration file; at a controller circuit, receiving a feature trigger; determining that a display feature associated with the feature trigger is disabled in the configuration file, responsive to receiving the feature trigger; generating a notification that the display feature is disabled but available, responsive to determining that the display feature associated with the feature trigger is disabled in the configuration file; receiving a pilot override after generating the notification that the display feature is disabled but available; enabling the display feature in the configuration file only upon receiving the pilot override; and generating a fault code in the configuration file, the fault code indicating that the display feature was enabled and an aircraft location at which the display feature was enabled.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWING FIGURES

At least one example of the present invention will hereinafter be described in conjunction with the following figures, wherein like numerals denote like elements, and:

FIG. 1 shows a functional block diagram of an aircraft including various systems, including a system for on-demand enabling of display features for an avionic display in an aircraft while the aircraft is in flight, in accordance with exemplary embodiments of the present disclosure; and FIG. 2 is a flowchart illustrating a method for on-demand enabling of display features for an avionic display in an aircraft while the aircraft is in flight, in accordance with exemplary embodiments of the present disclosure.

DETAILED DESCRIPTION

The following detailed description is merely exemplary in nature and is not intended to limit the invention or the application and uses of the invention. As used herein, the word "exemplary" means "serving as an example, instance, or illustration." Thus, any weather or flight display system or method embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, programmable logic arrays, application specific integrated circuits, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

Available weather radar systems often provide reflectivity data, which is an approximate measure of rainfall rate. However, a rainfall rate is not necessarily a hazard. A technical solution to this problem is proposed in commonly-assigned U.S. patent application Ser. No. 16,434,863, filed Jun. 7, 2019 "Systems and Methods for Determining Convective Cell Growth from Weather Radar Reflectivity Data," the contents of which are herein incorporated by reference in their entirety.

The '863 patent application generally describes analyzing reflectivity data to identify hazards, including hail, lightning, turbulence, and radar attenuation. Additionally, the algorithms in the '863 patent application use radar to assess the spatial trends of weather cells; this three-dimensional (3-D) Volumetric Buffer that stores reflectivity data stored in a three-dimensional (or "volumetric") buffer is a key technology enabler.

Moving forward, subscription models are anticipated. This enables payment for the collection of weather radar information to be spread among a large pool of users. In an embodiment, a base-level weather radar subscription service has a default configuration file enabling the display of basic display features, and customers can customize by purchasing and enabling the display of additional display features. Non-limiting examples of display features from the '863 patent application that an operator could pay to enable include: Inferred Turbulence, Two-Level Turbulence, Cell Growth, and Tracking.

However, scenarios are envisioned in which a user operating with the base-level weather radar subscription service may recognize a safety need for a display feature that has not been enabled. Further still, in some scenarios, the user might be unaware of the safety benefit of the display feature. Moreover, a weather radar subscription service is a subset example of subscription services that control display features, in general. Therefore, the above identified technical problem, in which a user who has purchased a base-level subscription service may (knowingly or unknowingly) face a safety need for a feature that has not been enabled applies to a variety of subscription services. Therefore, there is a safety need for a feature enablement capability that is realized as an additional algorithm to enable a relevant subscription-based feature upon detecting that is has been disabled via an agreement (i.e., contract) with a subscription service.

Generally disclosed herein are systems and methods for on-demand enabling of display features for an avionic display in an aircraft while the aircraft is in flight. This applies in a context in which a pilot or other user is viewing an avionic display that renders display features in accordance with a configuration file. Proposed embodiments can recognize the safety need for the display feature whether or not the user has recognized the safety need for it.

As used herein, the configuration file comprises a plurality of display features, each display feature of the plurality of display features having been enabled or disabled via an agreement (i.e., contract) with a subscription service. Consequently, only display features enabled via the subscription service may be rendered.

As will be described with more context below, the following examples of terms are provided: A "trigger condition" is an exceedance of a predefined threshold, and a system that determines that the trigger condition is occurring is referred to as a "trigger source." When a trigger source determines that trigger condition is occurring, the trigger source generates a respective "feature trigger." For example, when an amount of lightning increases beyond a threshold rate of increase (the trigger condition is occurring), a trigger source (a weather radar system) may generate a feature trigger (a lightning trigger). Responsive to the feature trigger, the system (FIG. 1 102) may cause a display feature (e.g., an indicator or symbol for lightning) to be rendered on the avionic display to alert a pilot that the lightning trigger condition has been detected. While the trigger source in the provided example is a weather radar system, it may be appreciated that other on-board systems and sensors, such as any of the avionic systems (FIG. 1, 114) (e.g., an engine) may be a trigger source.

While the following exemplary embodiments are discussed in terms of an aircraft in flight, it should be appreciated that other embodiments may be employed in other contexts, such as ground-based radar stations, or radar stations on other vehicles such as ocean-faring vessels, rail-travelling locomotives, automobiles, and the like. In particular, embodiments of the disclosure may be implemented wherever a weather radar system and associated processing software/hardware/display can be located.

FIG. 1 is a block diagram of a system for on-demand enabling of display features for an avionic display in an aircraft while the aircraft is in flight (shortened herein to "system" 102), in accordance with an exemplary and non-limiting embodiment of the present disclosure. The system 102 may be utilized onboard a mobile platform. In various embodiments, the mobile platform is an aircraft 100, which carries or is equipped with the system 102. Aircraft 100 may be any type of vehicle that is capable of travelling through the air (i.e., without physical contact with terrain or water). As such, aircraft 100 may be any type of airplane (regardless of size or propulsion means, ranging from large, turbine-powered commercial airplanes to small, electrically-powered drones), rotorcraft (helicopter, gyrocopter), lighter-than-air vessel (hot-air balloon, blimp), or glider, for example. Aircraft 100 may be "manned" in the conventional sense that the flight crew is present within the aircraft 100, or it may be manned remotely.

As schematically depicted in FIG. 1, system 102 includes the following components or subsystems, each of which may assume the form of a single device or multiple interconnected devices: a controller circuit 104 operationally coupled to: a HMI 106 (human-machine interface); a communications circuit 108; and one or more on-board systems and sensors 30. In various embodiments, the controller circuit 104 communicates with the other components of the system 102 via a communication bus 105.

The human-machine interface, HMI 106, may include a display device 20 and a user input device 24. In various embodiments, the HMI 106 is an integration of the user interface 18 and a display device 20. The user input device 24 may include any combination of a keyboard, cursor control device, voice input device, gesture input apparatus, or the like.

The display device 20 can include any number and type of image generating devices on which one or more avionic displays 22 may be produced. The display device 20 may embody a touch screen display. When the system 102 is utilized for a manned aircraft, display device 20 may be affixed to the static structure of the Aircraft cockpit as, for example, a Head Down Display (HDD) or Head Up Display (HUD) unit. Alternatively, display device 20 may assume the form of a movable display device (e.g., a pilot-worn display device) or a portable display device, such as an Electronic Flight Bag (EFB), a laptop, or a tablet computer carried into the Aircraft cockpit by a pilot.

In various embodiments, the HMI 106 further includes or has integrated therein an audio system capable of emitting speech and sounds, as well as of receiving speech input. In various embodiments, the HMI 106 may include any of: a graphical user interface (GUI), a speech recognition system, and a gesture recognition system. Via various display and graphics systems processes, the controller circuit 104 may command and control the generation, by the HMI 106, of a variety of graphical user interface (GUI) objects or elements described herein, including, for example, buttons, sliders, and the like, which are used to prompt a user to interact with the human-machine interface to provide user input, and to activate respective functions and provide user feedback, responsive to received user input at the GUI element.

The on-board systems and sensors 30 generally include a position-determining system 110 sensors, a weather radar system 112, various avionic systems 114, and a database 116. The on-board systems and sensors 30 may include a flight management system (FMS).

The position-determining system 110 supplies various types of aircraft status data or measurements to controller circuit 104 and the communication bus 105 during aircraft flight. In various embodiments, the aircraft status data includes, without limitation, one or more of: inertial reference system measurements providing a location, Flight Path Angle (FPA) measurements, airspeed data, groundspeed data (including groundspeed direction), vertical speed data, vertical acceleration data, altitude data, attitude data including pitch data and roll measurements, yaw data, heading information, sensed atmospheric conditions data (including wind speed and direction data), flight path data, flight track data, radar altitude data, and geometric altitude data. The position-determining system 110 may be realized as one or more of a global positioning system (GPS), inertial reference system (IRS), or a radio-based navigation system (e.g., VHF omni-directional radio range (VOR) or long-range aid to navigation (LORAN)), and it may include one or more navigational radios or other sensors suitably configured to support operation of the aircraft 100. In some embodiments, the position-determining system 110 may also obtain and/or determine the heading of the aircraft 100 (i.e., the direction that aircraft 100 is traveling relative to some reference) using a magnet compass or a magnetometer, for example. The position-determining system 110 may also include a barometric altimeter such that the position of the aircraft 100 may be additionally determined with reference to a barometric altitude. In some embodiments, the GPS may alternatively or additionally provide altitude information as part of the position-determining system 110. As such, in an exemplary embodiment, the position-determining system 110 is capable of obtaining and/or determining the instantaneous position and altitude of the aircraft 100, and the position-determining system 110 generates aircraft status data for the aircraft, including the current location of the aircraft 100 (e.g., the latitude and longitude) and the altitude and heading of the aircraft 100. The position-determining system 110 may provide this aircraft status data to the controller circuit 104 and the flight management system 120 to support their operation, as described herein.

The weather radar system 112 provides weather data and can be a trigger source. In various embodiments, the weather radar system 112 is the system described in more detail in reference patent application Ser. No. 16/434,863 Filed Jun. 7, 2019 "Systems and Methods for Determining Convective Cell Growth from Weather Radar Reflectivity Data." The weather radar system 112 is configured to generate reflectivity data at various altitudes over a geographic area (for example a distance range in front of the aircraft). The weather radar system 112 stores the reflectivity data in a three-dimensional ("volumetric") buffer having a plurality of addresses that are indicative of the geographic location and altitude from which the reflectivity data is obtained. Using the data in the volumetric buffer, addresses that are disposed vertically with regard to one another may be summed or otherwise integrated, resulting in a vertically-integrated reflectivity (VIR) value for a particular geographic location. Multiple adjacent VIR values may define a convective cell. The buffer is updated with new data over time, such data being compensated for movement of the aircraft, movement of the cell, and the curvature of the Earth. A comparison can be made between VIR values for a convective cell at a first time versus the VIR values at a second time to determine convective cell growth, if any. In various embodiments, if the comparison indicates a cell growth at a rate that exceeds a threshold, a trigger condition is determined to be occurring, and a respective feature trigger is generated. As will be described in more detail below, responsive to the feature trigger, the display device may render a display feature (e.g., symbology indicative of lightning, hail, etc.) on the avionic display 22.

Concisely, the weather radar system 112 is configured to (i) determine convective cell growth from weather radar reflectivity data by calculating vertically-integrated reflectivity (VIR) values for a column of cells associated with a latitude/longitude position at a respective time, (ii) determine that trigger conditions are occurring when a difference between time-sequential VIR values exceed a weather hazard threshold, the feature trigger having a location at the latitude/longitude position, and (iii) generate a feature trigger responsive to determining that trigger conditions are occurring.

Onboard avionic systems 114 provide feedback and control for the engine and flight configuration equipment. When avionic systems 114 serve as a trigger source, non-limiting examples of trigger conditions leading to a feature trigger include, an overheated engine, a faulty flap, a blade-out condition in an engine fan, and the like.

In practice, the database 116 may be realized as one or more different onboard databases, each being a computer-readable storage media or memory. In various embodiments, two- or three-dimensional map data may be stored in the database 116, including airport features data, geographical (terrain), buildings, bridges, and other structures, street maps, and navigational databases, which may be updated on a periodic or iterative basis to ensure data timeliness. This map data may be uploaded into the database 116 at an initialization step and then periodically updated, as directed by either a program 15 update or by an externally triggered update.

A configuration file 118 controls the features rendered on the avionic display 22. In various embodiments, the configuration file 118 may be stored in memory onboard the controller circuit 104, or in a separate storage or database 116. In various embodiments, the display device 20 references the configuration file 118 before rendering the avionic display 22.

Flight management system 120 provides the primary navigation, flight planning, and route determination and en route guidance for the aircraft 100. The flight management system 120 may contribute aircraft status data provided to controller circuit 104, such as, the aircraft's current position and flight direction (e.g., heading, course, track, etc.), the aircraft's airspeed, ground speed, altitude (e.g., relative to sea level), pitch, and other important flight information if such information is desired. In various embodiments, flight management system 120 may include any suitable position and direction determination devices that are capable of providing controller circuit 104 with at least an aircraft's current position (e.g., in latitudinal and longitudinal form), the real-time direction (heading, course, track, etc.) of the aircraft in its flight path, and other important flight information (e.g., airspeed, altitude, pitch, attitude, etc.). Flight management system 120 and controller circuit 104 cooperate to guide and control aircraft 100 during all phases of operation, as well as to provide other systems of aircraft 100 with flight data generated or derived from flight management system 120.

It should be appreciated that aircraft 100 includes many more additional features (systems, databases, etc.) than the illustrated systems 105-118. For purposes of simplicity of illustration and discussion, however, the illustrated aircraft 100 omits these additional features.

External sources 50 may include a weather subscription service, other subscription service, traffic monitoring service, neighbor traffic, air traffic control (ATC), ground stations, and the like.

The term "controller circuit," as appearing herein, broadly encompasses those components utilized to carry-out or otherwise support the processing functionalities of the system 102. Accordingly, controller circuit 104 can be implemented as a programmable logic array, application specific integrated circuit, system on a chip (SOC), or other similar firmware, as well as by a combination of any number of individual processors, flight control computers, navigational equipment pieces, computer-readable storage devices (including or in addition to memory 10), power supplies, storage devices, interface cards, and other standardized components.

In various embodiments, as depicted in FIG. 1, the controller circuit 104 embodies an enhanced computer system, having one or more processors 5 operationally coupled to computer-readable storage media or memory 10, having stored therein at least one novel firmware or software program 15 (generally, computer-readable instructions that embody an algorithm) for carrying-out the various process tasks, calculations, and control/display functions described herein. During operation, the controller circuit 104 may be programmed with and execute the at least one firmware or software program, for example, program 15, that embodies an algorithm for receiving, processing, enabling, generating, and altering renderings, described herein, to thereby perform the various process steps, tasks, calculations, and control/display functions described herein.

Controller circuit 104 may exchange data, including real-time wireless data, with one or more external sources 50, such as a configuration file manager or subscription service to support operation of the system 102 in embodiments. In this case, the controller circuit 104 may utilize the communications circuit 108 to manage bidirectional wireless data exchange over a communications network, such as a public or private network implemented in accordance with Transmission Control Protocol/Internet Protocol architectures or other conventional protocol standards. Encryption and mutual authentication techniques may be applied, as appropriate, to ensure data security. In various embodiments, the communications circuit 108 is integrated within the controller circuit 104.

Turning now to FIG. 2, and with continued reference to FIG. 1, a flowchart of a method 200 for on-demand enabling of display features for an avionic display in an aircraft while the aircraft is in flight is described, in accordance with exemplary embodiments of the present disclosure. For illustrative purposes, the following description of method 200 may refer to elements mentioned above in connection with FIG. 1. In practice, portions of method 200 may be performed by different components of the described system. It should be appreciated that method 200 may include any number of additional or alternative tasks, the tasks shown in FIG. 2 need not be performed in the illustrated order, and method 200 may be incorporated into a more comprehensive procedure or method having additional functionality not described in detail herein. Moreover, one or more of the tasks shown in FIG. 2 could be omitted from an embodiment of the method 200 as long as the intended overall functionality remains intact.

At 202, the system 102 is rendering the avionic display 5 described above. At 202, it is implied that the system 102 has been initialized, including the loading of the configuration file per a subscription service or display management service. The avionic display 5 is rendered in accordance with the configuration file (that specifies for each display feature of a plurality of display features, whether the display feature is enabled or disabled). The avionic display shows at least a location and trajectory of the aircraft. At 204, a feature trigger is received. The feature trigger can be received from one of the onboard systems and sensors 30, or from an external source 50, via the communications circuit 108. In various embodiments, the feature trigger is one of multiple feature triggers received at the same time. For example, for hail and lightning.

At 206, the system 102 may perform the task of determining that a display feature associated with the feature trigger is disabled in the configuration file, responsive to receiving the feature trigger. As mentioned, in various embodiments, the display feature is one of a plurality of display features that are either enabled or disabled. If at 204, multiple feature triggers are received, then at 206, the system 102 will determine for each feature of the multiple features, if it is enabled or disabled. Only the disabled ones are a potential problem. At 208, the system 102 performs the task of generating a notification that the display feature is disabled but available, responsive to determining that the display feature associated with the feature trigger is disabled in the configuration file. The task at 210 is optional; in some embodiments a pilot override has to be received at 210 to move to 212 to enable the display feature, and in some embodiments, a pilot override is not required and the system can move from 208 to 212.

At 212, the system performs the tasks of enabling the display feature in the configuration file and generating a fault code in the configuration file. As mentioned, the fault code indicates that the display feature was enabled and an aircraft location at which the display feature was enabled. At 214, the system performs the task of causing the display device 10 to update, to thereby render the display feature in an area of the avionic display that corresponds to a location of the feature trigger, responsive to enabling the feature. In some embodiments, as soon as the display feature is enabled, the display device 10 updates the avionic display 5, and in other embodiments, this is two separate tasks.

In various embodiments, the method 200 can keep cycling from 214 back to 204 until the aircraft lands; and potentially, by the time the aircraft lands, more than one fault code is generated.

At 216, the system 102 performs the task of reporting a fault code. This implies that the aircraft is no longer in flight. Accordingly, 216 includes the task of determining whether the aircraft is no longer in flight. In various embodiments, this may involve receiving a weight on wheels signal from an avionic system 114. Step 216 also includes connecting with a manager of the subscription service, via a communications circuit, responsive to determining that the aircraft is no longer in flight; and the reporting of the fault code to the manager of the subscription service. When more than one fault code is generated, each of the fault codes are reported at 216.

Accordingly, the present disclosure has provided several embodiments of systems and methods for on-demand enabling of display features for an avionic display in an aircraft while the aircraft is in flight. The disclosed systems and methods provide an objectively improved HMI over available avionics display systems by promptly alerting a pilot when a relevant display feature is disabled but available, and enabling the display feature in the configuration file; this delivers the most detailed alerting available to the pilot at a time of need. Furthermore, the recording and reporting of the enabling of the display feature, as a fault code, protects the managers of the configuration files and subscription service providers. Embodiments, therefore, maximize the use of the detailed alerting that the display features provide, while assuring accountability for using the display feature in an on-demand setting.

Although an exemplary embodiment of the present disclosure has been described above in the context of a fully-functioning computer system (e.g., system 102 described above in conjunction with FIG. 1), those skilled in the art will recognize that the mechanisms of the present disclosure are capable of being distributed as a program product (e.g., an Internet-disseminated program 15 or software application) and, further, that the present teachings apply to the program product regardless of the particular type of computer-readable media (e.g., hard drive, memory card, optical disc, etc.) employed to carry-out its distribution.

Terms such as "comprise," "include," "have," and variations thereof are utilized herein to denote non-exclusive inclusions. Such terms may thus be utilized in describing processes, articles, apparatuses, and the like that include one or more named steps or elements but may further include additional unnamed steps or elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for on-demand enabling of display features for an avionic display in an aircraft while the aircraft is in flight, the system comprising:

a source of aircraft status data for the aircraft;

a display device operationally coupled to the source of aircraft status data and configured to render the avionic display showing a location and trajectory of the aircraft and to render information on the avionic display, in accordance with a configuration file stored in memory onboard the aircraft, wherein the configuration file comprises a plurality of display features, each display feature of the plurality of display features being enabled or disabled in an agreement with a subscription service;

a trigger source configured to generate a feature trigger responsive to determining that trigger conditions are occurring;

a controller circuit operationally coupled to the source of aircraft status data, the display device, and the trigger source, the controller circuit configured to:

determine that a display feature associated with the feature trigger is disabled in the configuration file, responsive to the feature trigger;

generate a notification that the display feature is disabled but available, responsive to determining that the display feature associated with the feature trigger is disabled in the configuration file;

enable the display feature in the configuration file; and generate a fault code in the configuration file, the fault code indicating that the display feature was enabled and an aircraft location at which the display feature was enabled.

2. The system of claim 1, wherein the controller circuit is further configured to:

receive a pilot override after generating the notification that the display feature is disabled but available; and enable the display feature only upon condition that the pilot override is received.

3. The system of claim 1, wherein the trigger source is a weather radar system, configured to:

determine convective cell growth from weather radar reflectivity data by calculating vertically-integrated reflectivity (VIR) values for a column of cells associated with a latitude/longitude position at a respective time;

determine that trigger conditions are occurring when a difference between time- sequential VIR values exceed a weather hazard threshold; and generate the feature trigger having a location at the latitude/longitude position, responsive to determining that trigger conditions are occurring.

4. The system of claim 3, wherein the subscription service is a weather subscription service and the configuration file is a weather configuration file.

5. The system of claim 2, wherein the controller circuit is further configured to cause the display device to update, to thereby render the display feature in an area of the avionic display that corresponds to a location of the feature trigger, responsive to enabling the feature.

6. The system of claim 5, further comprising a communications circuit, and wherein the controller circuit is further configured to:

determine whether the aircraft is no longer in flight;

connect with a manager of the subscription service, via the communications circuit, responsive to determining that the aircraft is no longer in flight; and report the fault code to the manager of the subscription service.

7. A system for on-demand enabling of weather radar features for display in an aircraft, the system comprising:

a source of aircraft status data for the aircraft;

a display device operationally coupled to the source of aircraft status data and configured to render an avionic display showing a location and trajectory of the aircraft and to render weather information on the avionic display, in accordance with a weather configuration file stored in memory onboard the aircraft, wherein the configuration file comprises a plurality of display features, each display feature of the plurality of display features being enabled or disabled in an agreement with a subscription service;

a weather radar system configured to (i) determine convective cell growth from weather radar reflectivity data by calculating vertically-integrated reflectivity (VIR) values for a column of cells associated with a latitude/longitude position at a respective time, (ii) determine that trigger conditions are occurring when a difference between time-sequential VIR values exceed a weather hazard threshold, the feature trigger having a location at the latitude/longitude position, and (iii) generate a feature trigger responsive to determining that trigger conditions are occurring; and a controller circuit operationally coupled to the source of aircraft status data, the display device, and the weather radar system, the controller circuit configured to:

determine that a display feature associated with the feature trigger is disabled in the weather configuration file, responsive to the feature trigger;

generate a notification that the display feature is disabled but available, responsive to determining that the display feature associated with the feature trigger is disabled in the weather configuration file;

enable the display feature in the weather configuration file; and generate a fault code in the weather configuration file, the fault code indicating that the display feature was enabled and an aircraft location at which the display feature was enabled.

8. The system of claim 7, wherein the controller circuit is further configured to:

receive a pilot override after generating the notification that the display feature is disabled; and enable the display feature only upon condition that the pilot override is received.

9. The system of claim 8, wherein the controller circuit is further configured to cause the display device to update, to thereby render the display feature in an area of the avionic display that corresponds to the latitude/longitude position, responsive to enabling the feature.

10. The system of claim 9, further comprising a communications circuit, and wherein the controller circuit is further configured to:

determine when the aircraft is no longer in flight;

connect with a manager of the weather configuration file, via the communications circuit, when the aircraft is no longer in flight; and report the fault code to the manager of the weather configuration file.

11. The system of claim 10, wherein the manager of the weather configuration file is a weather subscription service.

12. A method for on-demand enabling of display features for an avionic display in an aircraft while the aircraft is in flight, the method comprising:

rendering, on a display device, the avionic display showing a location and trajectory of the aircraft, the rendering being in accordance with a configuration file stored in memory onboard the aircraft, wherein the configuration file comprises a plurality of display features, each display feature of the plurality of display features being enabled or disabled in an agreement with a subscription service;

at a controller circuit, receiving a feature trigger;

determining that a display feature associated with the feature trigger is disabled in the configuration file, responsive to receiving the feature trigger;

generating a notification that the display feature is disabled but available, responsive to determining that the display feature associated with the feature trigger is disabled in the configuration file;

receiving a pilot override after generating the notification that the display feature is disabled but available;

enabling the display feature in the configuration file only upon receiving the pilot override; and generating a fault code in the configuration file, the fault code indicating that the display feature was enabled and an aircraft location at which the display feature was enabled.

13. The method of claim 12, further comprising:

at a weather radar system, determining convective cell growth from weather radar reflectivity data by calculating vertically-integrated reflectivity (VIR) values for a column of cells associated with a latitude/longitude position at a respective time;

determining that trigger conditions are occurring when a difference between time- sequential VIR values exceed a weather hazard threshold; and generating the feature trigger having a location at the latitude/longitude position, responsive to determining that the trigger conditions are occurring.

14. The method of claim 13, wherein the subscription service is a weather subscription service and the configuration file is a weather configuration file.

15. The method of claim 14, further comprising causing the display device to update, to thereby render the display feature in an area of the avionic display that corresponds to a location of the feature trigger, responsive to enabling the feature.

16. The method of claim 15, further comprising:
determining whether the aircraft is no longer in flight;
connecting with a manager of the subscription service, via a communications circuit, responsive to determining that the aircraft is no longer in flight; and
reporting the fault code to the manager of the subscription service.

\* \* \* \* \*